May 10, 1949.　　　L. G. WILHELM　　　2,470,009
PIPE
Filed June 29, 1944
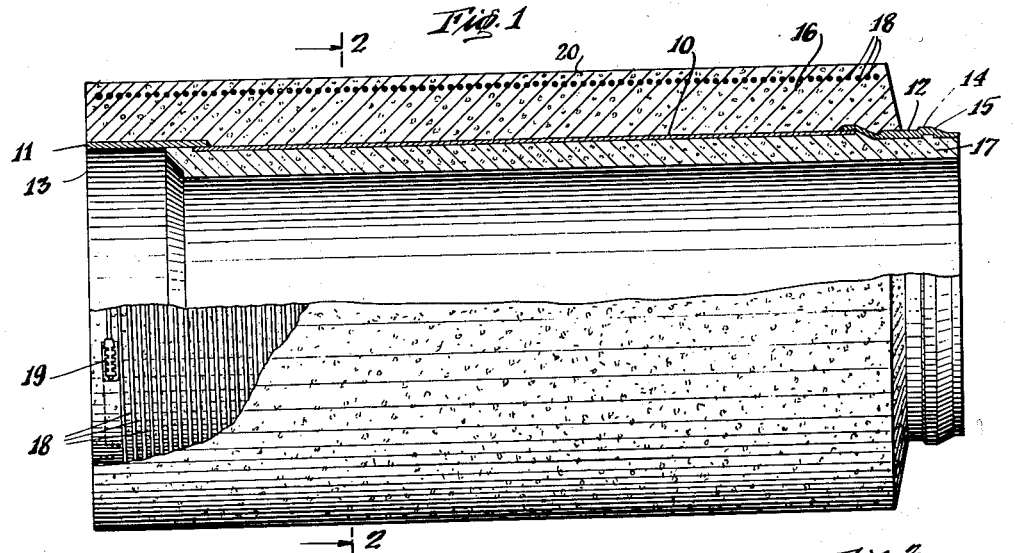
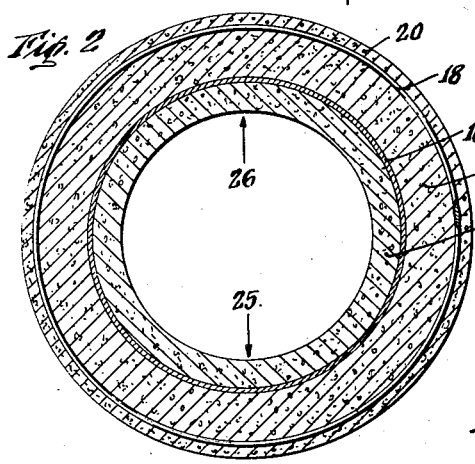
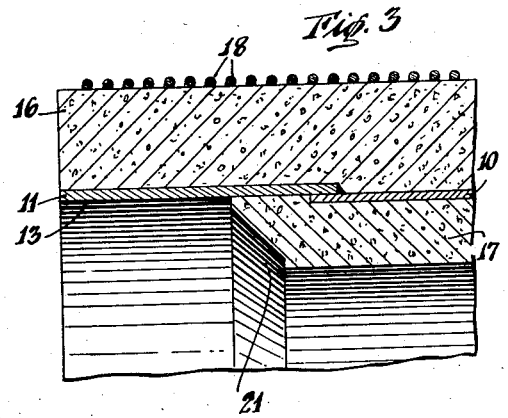
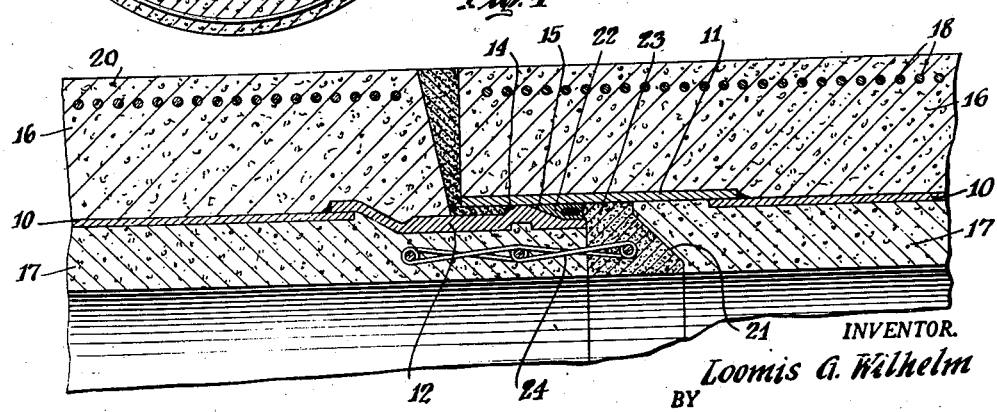
INVENTOR.
Loomis G. Wilhelm
BY
John C. Kerr
ATTORNEY Patented May 10, 1949

2,470,009

UNITED STATES PATENT OFFICE 2,470,009

PIPE

Loomis Goff Wilhelm, Henryetta, Okla., assignor to Lock Joint Pipe Company, East Orange, N. J., a corporation of New Jersey Application June 29, 1944, Serial No. 542,696

3 Claims. (Cl. 138—84)

This invention relates to prestressed reinforced concrete pipes and other high pressure pipes utilizing cementitious or other originally plastic and subsequently hardened materials and, more particularly, to pipes of such nature employing a fluid-tight metallic sleeve or cylinder.

The use of a steel sleeve in high pressure pipe is particularly desirable as it assures waterproofness and contributes materially to the strength of the pipe. According to the present invention the steel cylinder or sleeve is located within a wall of compressed concrete or other originally plastic and subsequently hardened material and the wall is placed under compression by a highly tensioned wrapping of steel.

Among the objects of the invention attained is the effecting of economies in prestressed concrete pipe of the steel cylinder type. A substantial saving in steel costs results from the reduction in poundage of wrapping material required because the bursting load of this type of pipe is figured against the steel sleeve and the diameter of the steel sleeve used when carrying out the invention is smaller than if the sleeve had such a diameter as to completely envelop all of the compressed concrete. A further saving in steel costs results from the use of smaller steel sleeves and of smaller joint rings.

Other advantages attaching to the pipe of the present invention include its greater effectiveness to resist stresses adjacent the top and bottom of the bore of the pipe which are caused by earth loads; greater protective covering for the outside covering of the steel sleeve; simplified connection of the steel sleeve to the joint rings especially when said rings are for joints which are sealed from the inside of the pipe; the employment of a strong protective covering over the bell joint ring without extending the construction beyond the outside diameter of the pipe; the elimination of an extended bell whereby the pipe is easier and more economical to handle, and the avoidance of the need for excavating bell holes in a trench which are necessary for accommodating pipes with extended bells; the more uniform distribution of compressional stress in the steel sleeve caused by the tensioned wire, and the reduction of the diameter of the steel sleeve, and the consequent reduction of the diameter of the joint, provides savings in sealing materials and labor for caulking of the joint. A further advantage results in the use of the invention in pipes having joints with recesses on the inside of the surfaces of the pipe which must be filled with mortar or some other filler. For such pipes there is a reduction of the amount of filler to be placed in the recess with a consequent saving of both material and labor.

Further and other objects and advantages of the present invention will be hereinafter set forth in the accompanying specification and claims and demonstrated by the drawings which show by way of illustration a preferred embodiment and the principle of my invention and what I now consider the best mode in which I have contemplated applying that principle. Other embodiments of the invention employing the same principle may be used and structural changes made as desired by those skilled in the art within the spirit of the appended claims and without departing from the present invention.

In the drawings,

Fig. 1 shows a pipe embodying the principle of the present invention, with portions broken away;

Fig. 2 is a section on line 2—2 of Fig. 1;

Fig. 3 is a detail showing a portion of the bell end of a pipe without a protective covering for the wire wrapping;

Fig. 4 is an enlarged detail of joined pipe ends.

The present invention is particularly applicable to the class of high pressure reinforced concrete pipes which are designed to withstand high bursting loads. This type of pipe has a fluid-tight steel cylinder or metallic sleeve. The sleeve is usually rolled from plate steel and in large pipe the plate is sufficiently thick to be strong enough for providing bearing surfaces for the joints at the ends of the pipe. In such pipe the joint portions are integral with the sleeve so that the sleeve extends for the full length of the pipe. If two pipes are joined by a sleeve coupling the entire length of the pipe sleeve has a uniform diameter, but in the case of a bell and spigot pipe, either a bell joint ring or a spigot joint ring is usually applied to one end of the pipe or, if desired, both joint rings are attached to the pipe sleeve. In any case, the metallic sleeve of a pipe includes joint portions because such joint rings as are used are welded to the sleeve entirely around their circumferences and thus constitute an integral fluid-tight metallic tube for all intents and purposes. For demonstrating a form of pipe wherein all of the advantages of the present invention attach, and not by limitation, I have illustrated in the drawings a pipe wherein the fluid-tight metallic sleeve 10, 11 and 12 is made up of and includes a tube 10, a bell joint ring 11 and a spigot joint ring 12. The joint rings are attached by welding to the respective ends of the tube entirely around their circumferences. The rings are of steel and usually of heavier gauge than that of the tube, although this relationship need not be adhered to. The respective rings are carefully made to provide close-fitting internal and external bearing surfaces, such as 13 and 14, which engage in sliding relation as shown in Fig. 4 when pipes are joined. In the form of joint illustrated the end edge of the bearing surface 14 of the spigot ring is bordered by a sloping surface 15 which forms a ramp whereby the joining of pipe ends is facilitated, but other forms of joints are usable with the invention. Also, if desired, the cylindrical tube 10 may be extended to either end of the pipe to serve as a joint bearing surface; for example, if the sleeve is so extended to serve as a bell, no additional bell joint ring would be required; and if the tube is so extended to serve as a spigot, no additional spigot joint ring would be required. For a double spigot-ended pipe, two spigot joint rings could be used or the extension of the tube to both ends of the pipe would provide spigot bearing surfaces.

The compressed wall of the pipe has two bodies of concrete or of other originally plastic and subsequently hardened material, one overlying the steel sleeve including the bell portion as shown at 16, and one lining the steel sleeve and spigot portion as shown at 17. These are of substantial thickness and either one may have the thicker wall. In general, concrete and mortar are preferred, but other plastic materials consisting of or containing organic plastics which are moldable and are strong enough to withstand the compression subsequently applied and hard enough to support the tensioned steel bands may be used. The two bodies of plastic material may be cast separately or simultaneously about the steel in a mold, or they may be applied in any manner desired as by lining the sleeve by a centrifugal process and forming the overlying body by projecting a stream of concrete, mortar or of other plastic material against the exterior of the sleeve and distributing it in such a manner as to form a layer of desired thickness.

After the plastic material is well cured and has undergone the greater part of its shrinkage the steel wrapping is applied over the outer tubular body of plastic material and given such tension as has been previously determined to be necessary for compressing the underlying core of the particular pipe being constructed. This is dependent upon the number of turns or encirclements of wrapping, gauge and tensile strength of wire selected for safely carrying the tensile stress required with due regard to the cost of the wrapping, the maximum pressure head and carrying capacity of the pipe, and the over-all tension required to maintain the plastic material in compression under working conditions.

While the prestressed wrapping may be in the form of individual bands of steel, I prefer a helical wrapping of high tensile steel wire 18, either as a continuous band, or in a series of several bands. The wire 18 is secured at its ends to the pipe by means of metallic anchors 19 embedded in the plastic material and it may likewise be secured at portions intermediate its ends. The wire may be wrapped in accordance with any available practice or by the use of the process described in United States Patent No. 2,348,765.

Depending upon the characteristics of the high tensile steel wire used and the strength of pipe desired, the prestressed wire may be applied at tensions ranging upwards to 200,000 lbs. per square inch and over.

The wire winding is spaced from the metallic sleeve and its tension causes compression in the layer of material intermediate itself and the sleeve and places the sleeve and interior tubular body under compression. It in effect creates a compressed wall or pipe core including plastic material, steel and plastic material in the order named. Ordinarily it is unnecessary to have a pitch for the winding which is so small as to bring adjacent convolutions thereof in contact with each other, and the placing of the winding against the overlying layer of plastic material effects uniform distribution of the compressive stress imparted to the steel sleeve. A portion of a pipe at this stage of construction is illustrated in Fig. 3. As thus formed it is capable of use as a pipe, but it is preferable to cover the winding for protective purposes.

After the winding is permanently secured in place an application of mortar, or of other plastic material 20, may be laid over or projected upon the wire and the exposed portions of plastic material between successive turns of the wire. If this latter covering is of the same kind of plastic material as that of the underlying tubular body, it will become, for all practical purposes, an integral part of the immediately underlying tubular body, with the result that the pretensioned winding is embedded within a solid body. Any other form of protective covering, such as a bituminous material, may be applied over the wire for preserving it against rust and physical injury.

It has been customary to form prestressed pipe of the steel cylinder type with the wire winding immediately in contact with the metallic cylinder or sleeve. In such a construction the cylinder and the joint portions are of greater diameter than the pipe of the present invention so that it is necessary to extend the construction at its bell end beyond the outside diameter of the pipe proper for completing the bell. The present invention dispenses with this extended construction and provides a pipe having a substantially uniform outside diameter throughout its length. An example of the value of this accomplishment is found in the savings involved in excavating a pipe tunnel. The tunnel can be made smaller because of the difference in cross-sectional area of an extended bell type of pipe and the lesser over-all cross-sectional area of the pipe of the present invention.

By locating the sleeve and joints within the compressed wall of originally plastic and subsequently hardened material of a pipe having the type of joint illustrated in Fig. 4, instead of immediately adjacent the outer surface of the pipe, the sealing recess 21 formed at the joined pipe ends is of a reduced circumference, with the result that less gasket material 22 is required. So, also, the amount of filling material 23 and the labor for caulking and filling the closed joint are likewise reduced. A wire mesh 24, partially embedded in the pipe lining, holds the fill 23 and gasket 22 in tight engagement with the spigot end of the pipe.

It is readily appreciated that the task of filling a recess having a depth of four or five inches presents difficulties which are greatly reduced in filling a recess of lesser depth. The deeper the filling recess the greater the difficulty of filling the recess with mortar, particularly overhead.

Some types of joints do not require a filling recess because they are automatically sealed when the pipes are joined. Except with regard to the filling recess inside of the pipe, the benefits of the present invention inure to high pressure pipes having self-sealing joints and to such pipes which have spigot portions at both ends which are joined by a sleeve coupling, and otherwise incorporating the principles of the invention herein disclosed.

It is desired that the prestressed hardened plastic material of the pipe remain in a state of compression under the usual working loads of the pipe. However, when a pipe is in the ground it is subjected to a flattening pressure due to earth load and the effect of this cannot always be foretold. The earth load tends to alter the compression pattern and in some cases may cause tensional stress adjacent the bore of the pipe and in line with the direction of the applied load as at 25 and 26, Fig. 2. With the steel cylinder disposed away from the wire winding and closer to the interior of the pipe, the chance of cracks developing in the lining from this cause is greatly diminished.

What is claimed is:

1. In a prestressed reinforced pipe, a fluid-tight metallic sleeve, a tubular body of originally plastic and subsequently hardened material in contact with the inside of said metallic sleeve, a tubular body of originally plastic and subsequently hardened material in contact with the outside of said metallic sleeve, and a tensioned metallic wrapping about said outside tubular body and subjecting said first and second named tubular bodies of hardened material and said metallic sleeve therebetween to circumferential compression.

2. In a prestressed reinforced concrete pipe, a fluid-tight metallic sleeve, a tubular body of concrete in contact with and lining the inside of said metallic sleeve, a tubular body of concrete in contact with and covering the outside of said metallic sleeve, and a tensioned wire wrapping helically wound around said outside tubular body of concrete, the tensioned wire of said helical wrapping effecting circumferential compression in both of said tubular bodies of concrete and in said metallic sleeve.

3. A high pressure reinforced concrete pipe comprising a fluid-tight steel sleeve, a layer of concrete in contact with and lining said steel sleeve, a layer of concrete thicker than said first-named layer of concrete and in contact with and covering the outside of said steel sleeve, a wrapping of tensioned wire overlying said covering layer of concrete, said wire being under sufficient tension to maintain said covering layer of concrete, said steel sleeve and said lining layer of concrete in a state of compression when said pipe is subjected to normal working pressure from fluid material contained in the pipe, and a protective covering over said winding of tensioned wire.

LOOMIS GOFF WILHELM.

REFERENCES CITED

The following references are of record in the file of this patent:

UNITED STATES PATENTS

| Number | Name | Date |
|---|---|---|
| 1,609,660 | Phelps | Dec. 7, 1926 |
| 1,770,180 | Mitchell | July 8, 1930 |
| 2,102,968 | Overvad | Dec. 21, 1937 |
| 2,236,108 | Miller et al. | Mar. 25, 1941 |
| 2,296,560 | MacKinnon | Sept. 22, 1942 |
| 2,348,477 | Jenkins | May 9, 1944 |